US006729421B1

(12) United States Patent
Gluck et al.
(10) Patent No.: US 6,729,421 B1
(45) Date of Patent: May 4, 2004

(54) MOTOR-ASSIST GURNEY UNIT AND METHOD

(75) Inventors: Lewis Gluck, Wappingers Falls, NY (US); Bruce Roseman, Mt. Kisco, NY (US)

(73) Assignee: Kaback Enterprises Inc., New York, NY (US)

( * ) Notice: Subject to any disclaimer, the term of this patent is extended or adjusted under 35 U.S.C. 154(b) by 0 days.

(21) Appl. No.: 09/873,333

(22) Filed: Jun. 5, 2001

Related U.S. Application Data

(60) Provisional application No. 60/209,541, filed on Jun. 6, 2000.

(51) Int. Cl.⁷ ................................................ B62M 7/14

(52) U.S. Cl. ........................................................ 180/11

(58) Field of Search .............................. 180/11–13, 16, 180/19.1, 19.2, 19.3, 65.1

(56) References Cited

U.S. PATENT DOCUMENTS 2,978,053 A * 4/1961 Seaman ...................... 180/12
3,199,621 A * 8/1965 Seaman ...................... 180/11
3,608,922 A * 9/1971 Best et al. ............... 280/43.12
3,752,345 A * 8/1973 Molis ......................... 414/498
3,826,322 A * 7/1974 Williams .................... 180/202
3,876,024 A 4/1975 Shieman et al.
4,077,535 A * 3/1978 Oriol .......................... 414/498
4,503,925 A * 3/1985 Palmer et al. ................ 180/13
4,768,241 A * 9/1988 Beney ........................... 5/600
4,945,592 A 8/1990 Sims et al.
5,050,695 A * 9/1991 Kleinwolterink, Jr. ....... 180/13
5,083,625 A 1/1992 Bleicher
5,117,521 A 6/1992 Foster et al.
5,125,468 A 6/1992 Coker
5,163,189 A 11/1992 DeGray
5,335,651 A 8/1994 Foster et al.
5,337,845 A 8/1994 Foster et al.
5,370,111 A 12/1994 Reeder et al.
5,457,831 A 10/1995 Foster et al.
5,513,406 A 5/1996 Foster et al.
5,580,207 A 12/1996 Kiebooms et al.
5,826,670 A 10/1998 Nan
5,885,048 A * 3/1999 Barth ......................... 414/495
5,987,671 A 11/1999 Heimbrock et al.
6,070,679 A 6/2000 Berg et al.
6,098,732 A * 8/2000 Romick et al. ............... 180/23
6,178,575 B1 * 1/2001 Harada .......................... 5/600

OTHER PUBLICATIONS

Calstart, Inc., "What is a Hybrid Electric vehicle?", www-.calstart.org, 1995, pp. 1–2.

Cooper et al., "Battery Power & You: How To Choose", www.SpinLife.com, pp. 1–8.

Dallas Controls DC–600 Model.

(List continued on next page.)

*Primary Examiner*—Lesley D. Morris
*Assistant Examiner*—Paul Royal, Jr.
(74) *Attorney, Agent, or Firm*—Greenblum & Bernstein, P.L.C.

(57) ABSTRACT

Motor-assisted unit for moving hospital gurneys. The unit includes a gurney, a detachable power unit for propelling the gurney, and a docking unit. The motor-assisted unit is usable with a plurality of gurneys. The unit further includes a power unit, having a plurality of sockets, which are adapted to engage one of a plurality of engagement pins or a plurality of recharging pins. Additionally, the power unit is steerable and includes a power supply, at least one drive wheel, a drive system, a steering column with handle bars attached substantially perpendicular thereto, and a plurality of idler wheels. Alternatively, the motor-assisted unit employs a drive-shaft mechanism to drive a retro-fitted hospital gurney center caster wheel. A method of propelling a gurney. The method includes docking the detachable power unit with a hospital gurney and propelling the gurney. The method further includes recharging the power unit.

66 Claims, 8 Drawing Sheets

OTHER PUBLICATIONS

Dynamic Controls Wheelchair Motors Product Catalogue for WMT90102 and WMT90112.

Hayes Mechanical Disc Brake product specification, 2001.

Hayes Hydraulic Disc Brake Open System general specifications, www.hayesdiscbrake.com, 2001.

OEM–002401.5 Mobil–Line battery charger product specification, www.hayesdiscbrake.com, 2001.

PN NPC–60552–R (OR L) Model product specification from National Power Chair.

Warner Electric 2000 Product Catalogue, "Packaged Electromagnetic Clutches and Brakes", Catologue No. P–1234, pp. 70–75.

Zapi, Inc.—H1–H2 Series Controllers.

* cited by examiner

MOTOR-ASSIST GURNEY UNIT AND METHOD

PRIORITY

This application claims priority under 35 U.S.C. §119(e) to provisional application No. 60,209,541 filed on Jun. 6, 2000, incorporated by reference.

BACKGROUND OF THE INVENTION

1. Field of the Invention

The present invention is related to hospital gurneys, and more particularly to motorized attachments for hospital gurneys to aid in moving hospital gurneys, stretchers, and other patient-moving devices from one place to another.

3. Description of Background Information

In a hospital setting, it is often required to move patients from one area of the hospital to another as rapidly as possible. For example, if a patient comes into the emergency room, he may need to be rushed to another department such as radiology or surgery. Typically, patients are placed on stretchers or gurneys, i.e., thin beds placed on a wheeled frame. Hospital staff generally push patients on gurneys from one place to another manually. Under the best of circumstances, this can prove to be an exhausting exercise. The process can be complicated by old, worn-out gurneys that do not travel easily and/or by obese patients and less than fit hospital staff.

Several attempts have been made in constructing a gurney having its own powered drive mechanism to make it easier for the hospital staff to move them around. One such device is described in U.S. Pat. No. 5,163,189 to DeGRAY, in which a self-powered gurney is disclosed that includes its own power source and power steering, as well as an elevatable and tiltable patient support surface. There are important drawbacks to self-powered gurney devices such as those disclosed in DeGRAY. For one, they are expensive to purchase and maintain. Moreover, a hospital seeking to use such a device would have to replace its existing fleet of gurneys. Also, the DeGRAY device appears to be difficult to recharge easily.

Other devices have been created that are attachable to non-motorized wheelchairs to retrofit the wheelchair to include a propulsion device. Such devices are described in U.S. Pat. No. 5,826,670 to NAN; U.S. Pat. No. 5,125,468 to COKER; and U.S. Pat. No. 2,978,053 to SCHMIDT. These devices, however, suffer from several shortcomings. For instance, these devices are wheelchair attachments, not gurney attachments, and many emergency patients are typically not capable of being moved from one place to another in a seated position. Rather, they must be moved while lying down. Additionally, these attachments are designed to enable the wheelchair user to motivate the wheelchair himself, as opposed to someone pushing the wheelchair. Such a device is not helpful for a gurney-bound patient, who is typically in no position to be motivating himself anywhere. Further, these prior wheelchair attachment devices are generally difficult to attach and detach from a wheelchair, especially as wheelchairs come in different sizes. As such, it would be impractical to use such a device on a gurney, since gurneys often need to be used in a hurry.

Further, attempts have been made to provide motivation devices for hospital gurneys. Such a device is described in U.S. Pat. No. 5,337,845 to FOSTER et al. This device however is limited to hospital gurneys of a specific design, i.e., those with a "Y" shaped footprint, and cannot be easily employed to propel a variety of hospital gurneys. That is, the device disclosed in FOSTER is not universal with respect to a variety of hospital gurney, and thus cannot be easily employed therewith. Further, due, inter alia, to the manner in which weight is distributed over the drive wheel and to the employment of a gas strut in instant invention, there is no problem with slippage of the drive wheel.

Finally, none of the above-referenced U.S. patents discuss or suggest a simple and convenient way to charge or recharge the device when it is not being used.

SUMMARY OF THE INVENTION

Accordingly, it is an object of the invention to provide a power-assist attachment for an existing hospital gurney.

It is another object of the invention to provide a power-assist attachment for a gurney that is easily attached and detached to and from the gurney.

It is another object of the invention to provide a power-assist attachment for a gurney that is easily adjusted to accommodate different sizes of gurneys.

It is another object of the invention to provide a power-assist attachment for a gurney that facilitates the pushing of a gurney.

It is another object of the invention to provide a power-assist attachment for a gurney that is easily charged and recharged.

The above and other objects are achieved by the invention, which is a motor-assist gurney attachment.

A motor-assisted unit for moving hospital gurneys in provided which includes a docking unit and a detachable power unit, which are both usable with a plurality of gurneys. The docking unit further includes a plurality of receptacles and a plurality engagement pins, with the receptacles being adapted to engage one of a plurality of engagement pins or a plurality of recharging pins.

Further, the power unit includes a power supply, at least one drive wheel, a drive system, a motor, at least one retractable idler wheel, and a steering column. In addition, the steering column, which passes through at least a collar, bushings, or bearings, is provided with handle bars. The steering column also may be provided with controller grips on the handle bars, and its height may be adjustable.

With respect to the drive system, the motor is connected to the at least one drive wheel via a drive belt, chain, drive-shaft, or gears. Further, the drive wheel may be steerable. In another embodiment, the present invention may utilize the hospital gurney center castor wheel as a drive wheel. The power unit of the present invention may also include brakes.

The present invention also includes a charging station, which may either be part of the power unit or a separate unit itself, to charge the battery (i.e., power source) of the power unit. Further, the charging station may include a battery charger and a plurality of electrically conductive recharging pins. In addition, the charging unit may receive power from a 110 volt AC source (i.e., conventional wall socket). The receptacles also have electric contacts located in their innermost portions, which are electrically connected to the power supply.

In the present invention, the recharging pins have a notch located substantially on the distal end, which allow them to be secured within the receptacles via a locking unit. The locking unit includes a substantially "U" shaped substantially flat plate, which engages the notch, thereby securing the power unit to the charging station, when the substantially flat plate is lowered over the recharging pins.

As disclosed, the docking unit of the present invention includes at least one mounting plate, which is usable with a plurality of gurneys, and may be disposed on either a hospital gurney or the power unit. When affixed to the hospital gurney, the mounting plate is fixed to the hospital gurney via at least one "U-bolt." Further, there are engagement pins attached to the mounting plate, which are vertically adjustable. In addition, the engagement pins have a notch located substantially on the distal end, which may be employed with a locking unit to secure the engagement pins within the plurality of sockets. The locking unit includes a substantially "U" shaped substantially flat plate, which engages the notch, thereby securing the power unit to the hospital gurney, when the substantially flat plate is lowered substantially perpendicular to the engagement pins.

In the present invention, the power unit includes a power supply, at least one drive wheel (which may be steerable), a drive system, a motor, at least one retractable idler wheel, and a steering column. The power unit may also include a battery charger, and the a steering column may further include handle bars which are attached substantially perpendicular thereto. Additionally, the motor is connected to the at least one drive wheel via a drive belt, chain, drive-shaft, or gears. In another embodiment, the drive wheel may be a hospital gurney center castor wheel. Further, the steering column passes through and freely rotates within at least of one collar, bushing, or bearings. The power unit may also include comprises brakes.

When affixed the hospital gurney the mounting plate, of the docking unit, is attached to the hospital gurney via at least one "U-bolt," and the plurality of engagement pins (which may be vertically adjustable) are attached to the at least one mounting plate.

A method of propelling a hospital gurney is provided, which includes docking a detachable power unit to a gurney, propelling the gurney with the detachable power unit, steering the detachable power unit via a substantially vertical steering column. Further, the detachable power unit is generic with respect to the hospital gurneys in the method of the present invention. In addition, the method includes detaching the power unit from the hospital gurney and docking it with a different hospital gurney. The method also includes recharging the power unit, by docking it with a recharging station, or simply plugging the on-board charger into a conventional 110 volt AC wall socket.

DETAILED DESCRIPTION OF THE INVENTION

Description of the invention will be given with reference to FIGS. 1–7. It is to be understood that the figures are merely illustrative of the invention and are not meant to delimit the scope thereof.

Figure 1:
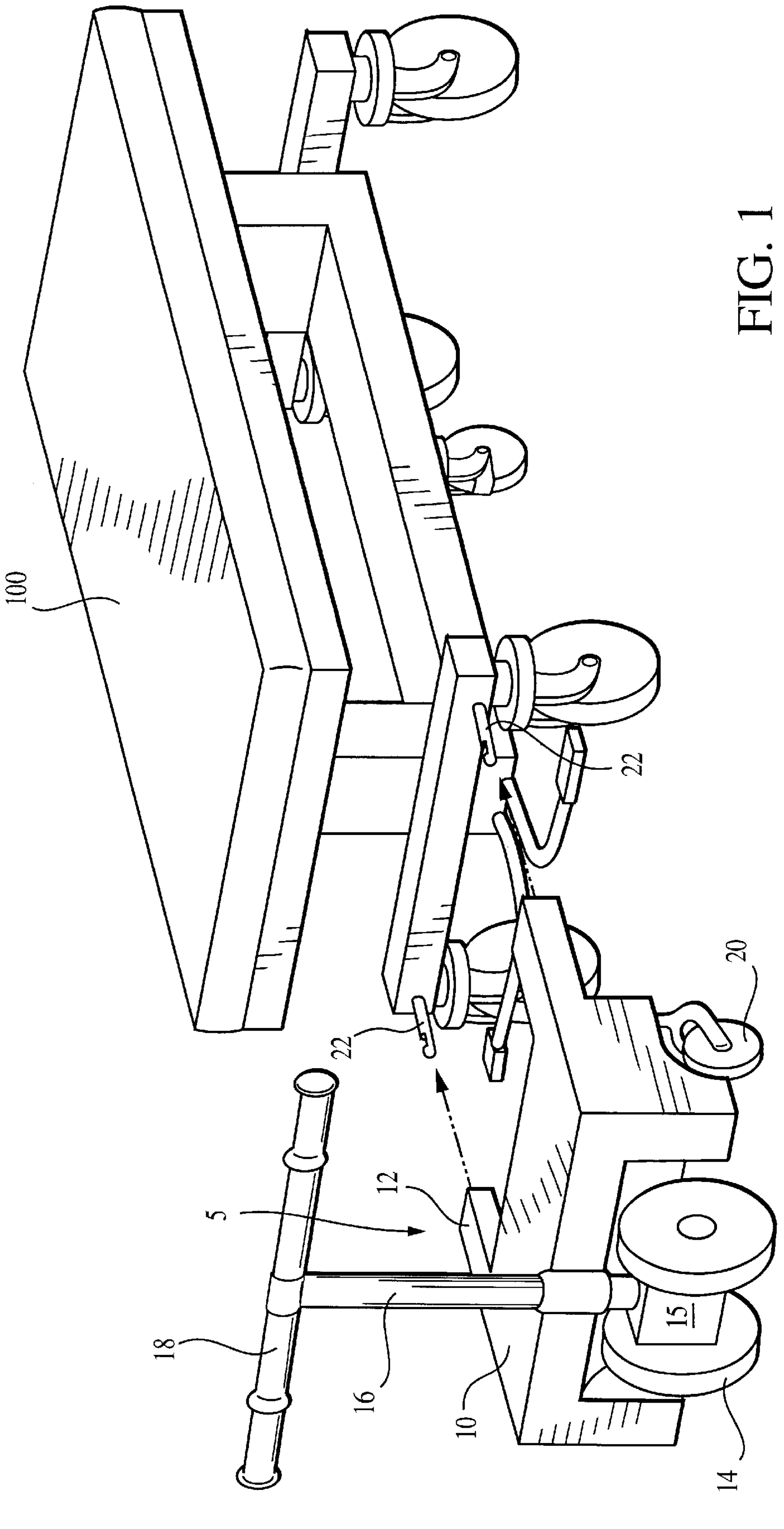
FIG. 1 is a perspective view of one embodiment of the invention about to be connected to a gurney.

FIG. 1 illustrates the detachable power unit 5 in perspective view in a position where it is about to be attached to a conventional gurney 100. The unit 5 includes a main housing 10 which encases a power supply (see FIG. 2). Projecting from main housing 10 are sockets 12. While two sockets are shown in this embodiment, it is contemplated that any convenient number of sockets may be employed. Sockets 12 are adapted to engage pins 22 disposed on gurney 100. That is, the power unit attaches to a gurney with locking pins provided on the gurney. In FIG. 1, the pins are attached directly to the gurney. The pin configuration of the embodiment will be explained below.

As shown in FIG. 1, power unit 5 includes a drive wheel 14 attached via a steering column to handlebars 18. Drive system 15 is mechanically connected to drive wheel 14 to impart power to the device. Power controllers may be disposed on the handlebars and will be described below. The unit also has a pair of retractable idler wheels 20. When the power unit is attached to a gurney and is in use, idler wheels 20 are intended to be retracted. When power unit 5 is detached from a gurney and is being transported either to or from its charging station (to be described below), idler wheels 20 are intended to be lowered so as to contact the ground in order to facilitate the maneuvering of the power unit.

Figure 2:
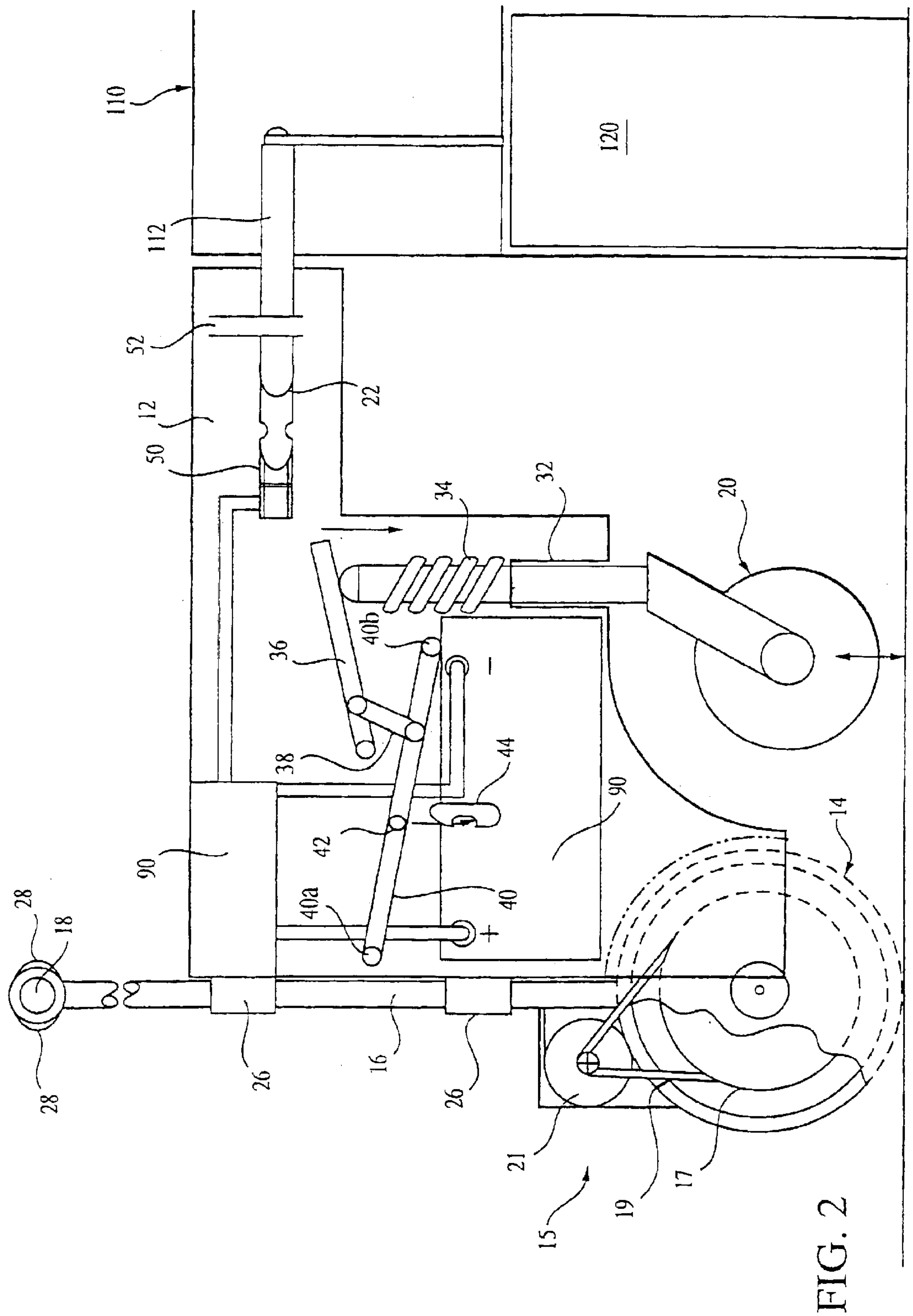
FIG. 2 is a side view of the internal workings of an embodiment of the invention docked at a charging station.

FIG. 2 illustrates power unit 5 docked with a charging station 110 in accordance with the invention. As shown in the drawing, idler wheels 20 are retracted. Idler wheel 20 is attached to vertical shaft 32 which is biased in the up position shown by spring 34. A linkage system enables the user to raise and lower the idler wheel with ease. The linkage system includes arm 40 having proximal end 40*a* and distal end 40*b*. Attached to proximal end 40*a* may be a handle (not shown) that projects from housing 10 either from the side or from the rear, or in any other convenient configuration. Pushing down on proximal end 40*a* of arm 40 transmits force through linkage 38 to pivoting arm 36. Pivoting arm 36 moves downward and pushes down on shaft 32 against the force of spring 34. This causes the idler wheels to be lowered. Pin 42 on arm 40 engages locking cam 44, and the wheels 20 remain lowered until cam 44 is manually released. The linkage system shown in FIG. 2 is one way of enabling the deployment/retraction of idler wheels 20.

In the alternative, the power unit 5 may incorporate an onboard charging unit (not shown). Onboard charging units of this nature are currently employed on conventional motorized wheelchairs employing DC motor and battery systems (which are discussed later). One example of such an onboard charger is the 24-volt/5-amp Mobil-Line battery charger (OEM-002401.5). These onboard chargers recharge the DC battery by plugging into a conventional AC wall outlet.

The drive system 15 of power unit 5 is also shown in more detail in FIG. 2. It includes motor 21 mechanically connected via belt or chain 19 to sprocket 17, which is connected in turn to drive wheel 14. On the opposite side of the motor is similarly connected another drive wheel to the motor 21 via a similar drive belt or chain (not shown). The entire drive system. 15 is steerable because it is connected to handlebars 18 via steering column 16. Collars or bushings 26 are attached to main housing 10; steering column 16 passes through collars 26 and is allowed to freely rotate therein. Bearings are preferably provided within collars 26 to minimize the friction between column 16 and collars 26.

Instead of providing a single steering column as shown, it is contemplated that the invention also may include a telescoping steering column which would enable the user to adjust the height of the handlebars to a comfortable level.

Power is supplied to motor 21 via power controller/battery pack 90 shown schematically in FIG. 2. The functioning of the motor is controlled via control grips 28 disposed on handlebars 18. Control grips 28 are preferably pressure transducers or forced displacement controllers which are sensitive to the grip of the user; the harder the user squeezes the grip, the more power is supplied to the motor, and the more assistance the power unit provides to the user. Suitable hand control grips are manufactured by Measurement System, Inc. of Fairfield, Connecticut, for example. Control grips 28 are electrically connected to power controller/battery pack 90 via conventional wiring (not shown). Brakes (not shown) may be provided; for instance closed loop hydraulic or mechanical calipers. One such manufacturer of these type of brakes is Hayes Disc Brake of Mequon, Wis. In the alternative, the motor 21 may also have an electrically controlled braking system, such as those DC motors which are currently in use with conventional motorized wheelchairs. Examples of such electric brakes include those disclosed in pages 70–75 of Warner Electric's 2000 product catalogue "Packaged Electromagnetic Clutches and Brakes" (Catalogue No. P-1234), which is incorporated herein by reference. Further, the power unit 5 may employ a regenerative braking system such as the Zapi, Inc. (Raleigh, N.C.) H1 and/or H2 series controller.

Power controller/battery pack 90 and motor 21 are of the type and power used in conventional motorized wheelchairs, e.g., they are a DC battery and a DC motor respectively. Examples of such DC motors are the Dallas Controls DC-600 Model, the Dynamic Controls WMT90102, and the Dynamic Controls WMT90112. As shown in FIG. 2, power controller/battery pack 90 is electrically connected to sockets 12. Sockets 12 are provided at their innermost portions with electrical contacts 50. A sliding lock 52 is provided in sockets 12 closer to the distal ends of sockets 12 for engaging the pins that are to be inserted into the sockets.

The power unit is shown in FIG. 2 as being docked with a charging station 110. Charging station 110 is provided with recharging pins 112 which are designed to be inserted into sockets 12 in order to recharge power controller/battery pack 90. The recharging pins are electrically conductive and are adapted to make electrical engagement with contacts 50 of sockets 12. Recharging pins 112 are also electrically connected to terminals of battery charger 120. In this way, when power unit 5 is attached to a charging station 110, power flows from charger 120 through pins 112; power is conducted to power controller/battery pack 90 via electrical contacts 50 in sockets 12. Sliding lock 52 engages a notch in pins 112 to secure the power unit to the charging station 110 and to keep the recharging pins firmly in contact with electrical contacts 50. The charging station 110 may be a fixed unit that can be plugged into a conventional AC wall outlet. A suitable example of such a charging unit is the Lester Electrical of Nebraska (Lincoln, Neb.) 24-volt charging unit.

Electrical contacts 50 are provided all the way inside sockets 12 to protect them from abrasion. Recharging pins 112 are designed to be longer than gurney pins 22 so that only recharging pins 112 will extend all the way inside sockets 12 and be able to engage contacts 50. As shown in FIG. 2, the outline of pin 22 is shown as being much shorter than pin 112. That way, when the power unit 5 is coupled to a gurney, the gurney pins will not scrape or abrade the electrical contacts.

Figure 3:
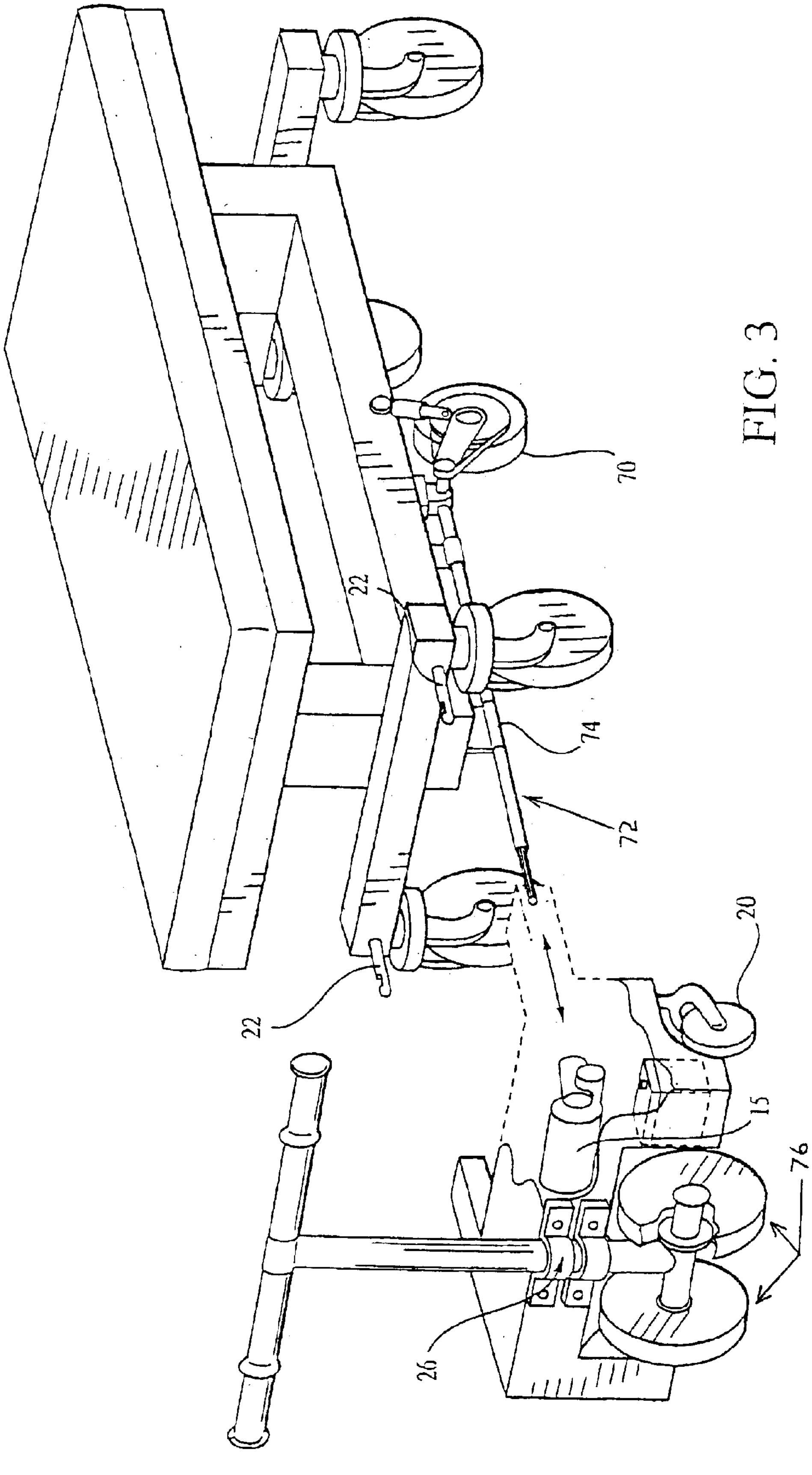
FIG. 3 is a view of an alternate embodiment employing a drive-shaft to drive a retro-fitted gurney center caster wheel.

FIG. 3 illustrates an embodiment of the invention which employs a drive-shaft 72 to drive a retro-fitted gurney center caster wheel 70. The motor 21 drives a drive-shaft 72, which drives the retro-fitted gurney center caster wheel. The drive-shaft 72 is attached to the bottom of the gurney with height adjustable brackets 74.

The power unit 5 is steerable via handle bars 18, which are attached to a steering column 16 and which are attached to at least one steering wheel 76. The steering column rotates freely and passes through either collars or bushings 26, which are attached to the power unit housing 10.

This embodiment also has retractable idler wheels 20, which operate as previously discussed. Further, this embodiment may dock with the charging station 110, or it may employ an onboard charging unit as discussed above.

Figure 3A:
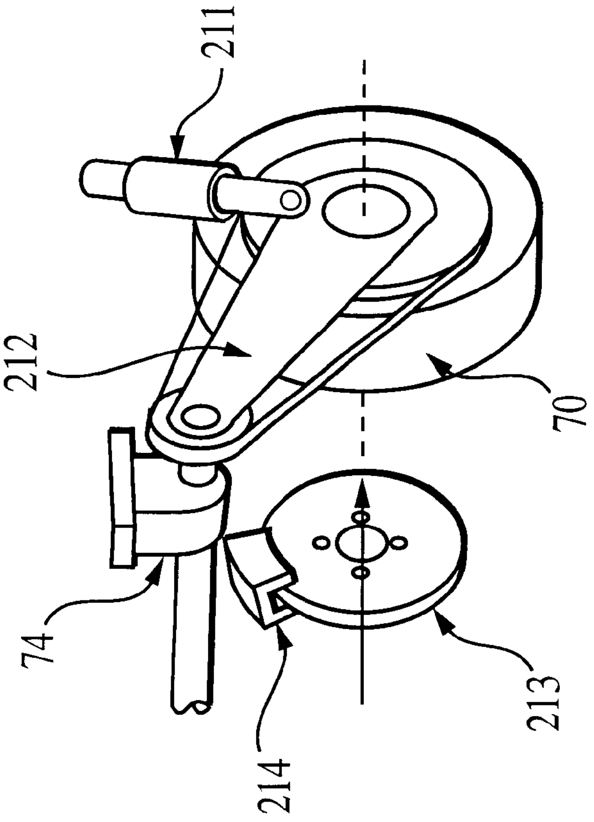
FIG. 3*a* is a view of a retro-fitted gurney center caster wheel.

FIG. 3*a* depicts the retro-fitted gurney center caster wheel in greater detail. Traction between the retro-fitted gurney center caster wheel and the ground is maintained, regardless of the weight disposed on the gurney, via a gas-filled strut 211 (this arrangement may employ a second gas-filled strut which is not pictured), spring or the like. This embodiment may also be fitted with brakes, which in this figure are shown as a disc brake 213 with caliper 214 (the disc brake 213 and caliper are not mounted in this figure).

Figure 4:
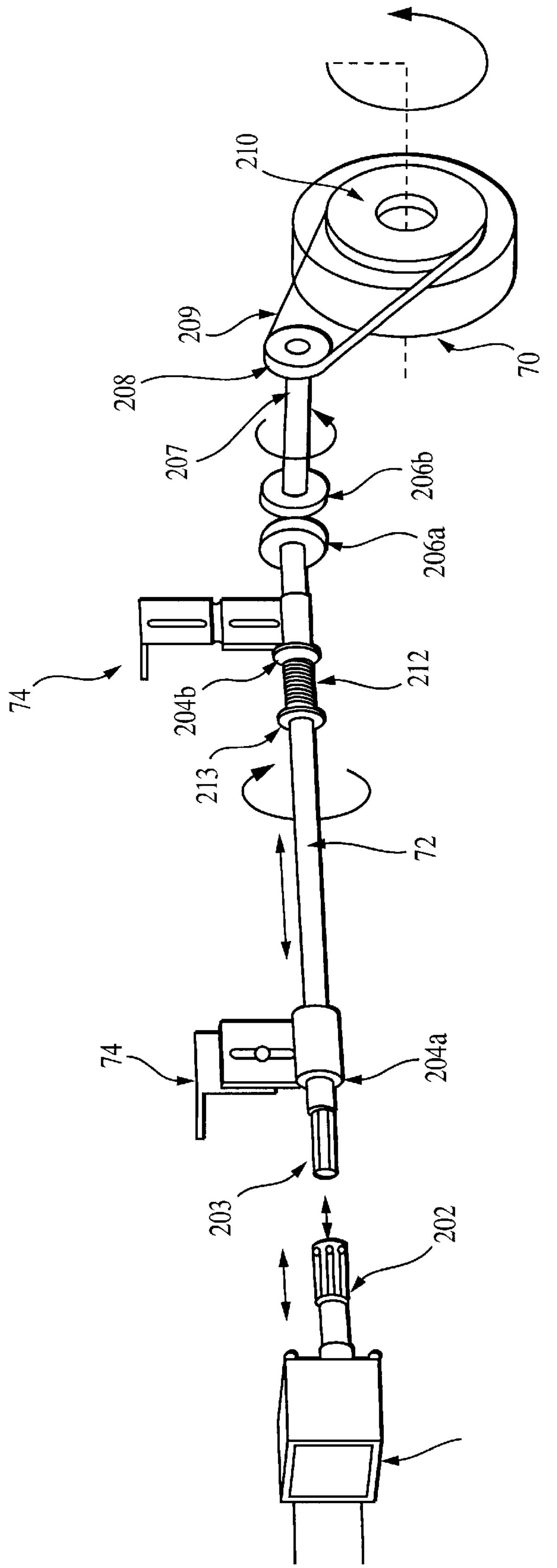
FIG. 4 is a detailed view of a drive-shaft.

Drive-shaft 72 is shown in greater detail in FIG. 4. Motor 21 drives the drive-shaft 72 via shaft coupling 202. Power is distributed to the drive-shaft 72 via the shaft coupling 202 which is a female coupling that mates with the male coupling of the drive-shaft end 203. However, the couplings can be reversed, i.e., drive-shaft end 203 is a female coupling and the shaft coupling 202 a male coupling. The drive-shaft is supported by height adjustable brackets 74 which are equipped with a linear bearing 204*a–b*.

The drive-shaft assembly employs a spring 212 which is captured between linear bearing 204*b* and thrust bearing 213. The spring 212 minimizes drag and friction on the center castor wheel when the power unit 5 is disengaged from the hospital gurney. That is, the spring 212 disengages drive-shaft 72 so that the drive shaft assembly need not be in motion when the disengaged hospital gurney is manually pushed.

Force is transferred from the drive-shaft 72 to the center caster wheel 70 via a system of bevel gears 206*a–b*, cog-belt pulley shaft 207, and pulleys. Bevel gears 206*a–b* mesh and turn to impart force from drive-shaft 72 to cog-belt pulley shaft 207. The cog-belt pulley shaft 207 drives cog-belt drive pulley 208 which drives the cog-belt reduction pulley 210 via cog-belt 209. The cog-belt reduction pulley 210 is attached to the center castor 70.

Figure 5:
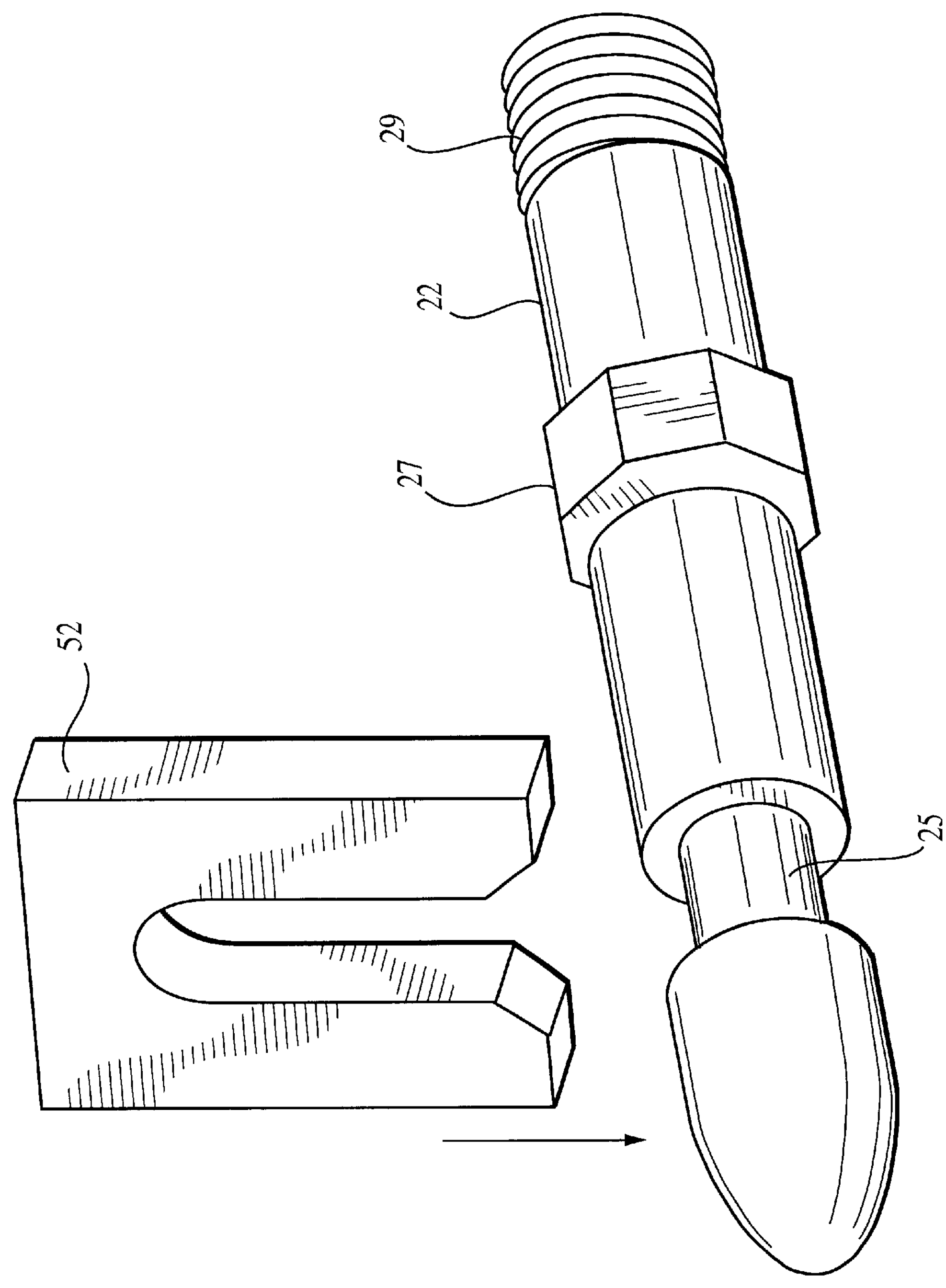
FIG. 5 is a perspective view of the locking mechanism.

Pin 22 is shown in greater detail in FIG. 5. The pin 22 is provided with a notch 25 close to the distal end of the pin. Notch 25 is adapted to engage sliding lock 52 of socket 12 when the pin is inserted therein. When sliding lock 52 engages notch 25, the pin cannot disengage from the socket, and thus the gurney cannot detach from the power unit. A nut 27 is also provided fixed to pin 22. At the proximal end of the pin are provided threads 29 which enable the pin to be screwed into place on the gurney.

Figure 6:
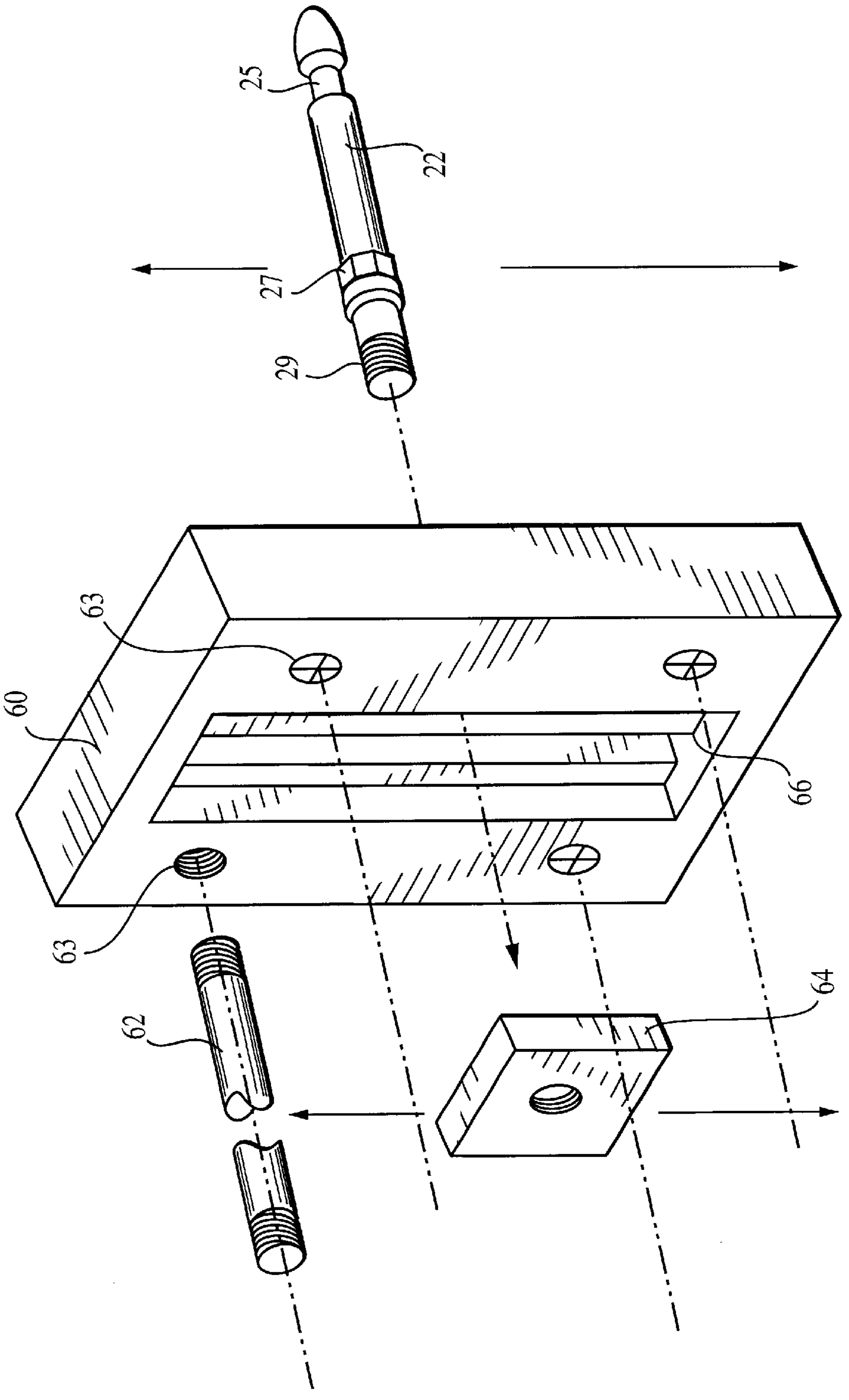
FIG. 6 is a perspective view of the pin attachment plate, for attaching the pins to the gurney.

As mentioned above, pins 22 may be attached directly to the gurney. FIG. 6 illustrates the preferred method by which the pins are attached. A mounting plate 60 is fixed to the gurney via a number of bolts 62. Bolts 62 may be U-bolts, straight bolts, or any conventional type of securing mechanism. U-bolts are preferred because mounting plate 60 can thereby be easily affixed to the gurney without requiring any soldering or other similar processes to the gurney; also, the mounting plate can be more easily removed by using U-bolts. Only one bolt 62 is shown, however it is intended that a number of bolts be used, corresponding to the number of threaded bores 63 formed in mounting plate 60.

Figure 7:
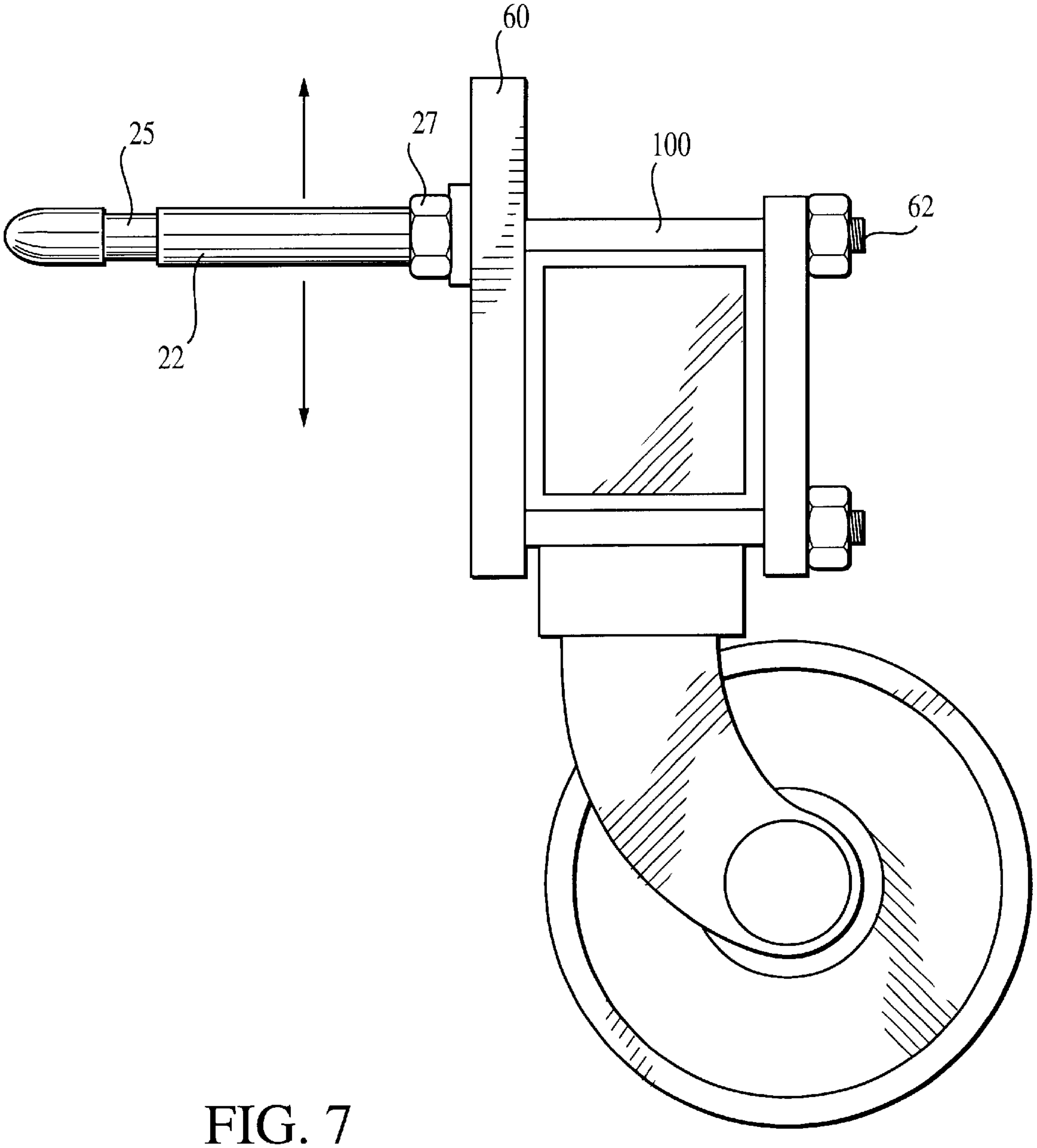
FIG. 7 is a side view of the pin attachment plate of FIG. 5 attached to the gurney.

Threads 29 of pins 22 are adapted to be threaded into sliding square nut 64. Nut 27 serves to tighten pin 22 to square nut 64. Square nut 64 fits in and slides along slot 66 of mounting plate 60. Pin 22 may be loosened by applying torque to nut 27 to allow square nut 64 to slide or may be tightened to fix it in place in slot 66. The height of pin 22 may be adjusted vertically by sliding square nut 64 in slot 66. This is important because different gurneys have different structures, and the mounting plate may be higher or lower on one brand of gurney as opposed to another. The ability to move the pin 22 vertically enables the pin to be lined up with the sockets of the power unit. One mounting plate 60 is shown having one slot 66; however, it is also contemplated to provide one long mounting plate, which is as wide as the gurney, having two slots moving two pins up and down. Alternatively, two single-slot mounting plates may be employed. FIG. 7 is a side view of the pin 22 secured to the mounting plate 60 and the mounting plate secured to the gurney 100.

In an alternative embodiment, pins 22 and recharging pins 122 may be disposed on the power unit 5, and the docking unit may be disposed on the gurney 100. In operation, the preferred embodiment of the invention works as follows. When the power unit 5 is idle, it is docked with charging station 110 so as to maintain a full charge on the battery at all times. The idler wheels 20 are in their extended position. When the power unit 5 is called into service, the switch (not shown) linked to end 40*a* of arm 40 is pushed downwards, extending the wheels 20 down to contact the ground. Sliding lock 52 is withdrawn from engagement of pins 112 and the power unit 5 is withdrawn from the charging station 110. Power unit 5 is easily transported to a waiting gurney 100 on which mounting plate 60 has already been secured. Pins 22 engage sockets 12, and each sliding lock 52 is lowered to engage the notch 25 of each pin 22. The power unit 5 is thus secured to the gurney. Cam lock 44 is released to allow idler wheels 20 to retract upwards. The power unit 5 is now ready for use. The user then squeezes control grips 28 to cause power supply 90 to actuate motor 21. Motor 21 causes drive wheels 14 to turn, thereby assisting the user in pushing the gurney from place to place.

Without further elaboration, it is believed that one skilled in the art can, using the preceding description, utilize the present invention to its fullest extent.

Although the invention has been described with reference to particular means and embodiments, it is to be understood that the invention is not limited to the particulars disclosed, and extends to all equivalents within the scope of the claims.

We claim:

1. The combination of a gurney docking system and a detachable power unit that can be docked to a side of a hospital gurney, said combination comprising:

the detachable power unit comprising a plurality of receptacles; and the gurney docking system comprising a plurality engagement pins adapted to be connected to the side of the hospital gurney, wherein the plurality of receptacles are configured to receive the plurality of engagement pins when the detachable power unit is docked to the side of the hospital gurney.

2. The combination of claim 1, further comprising at least one mounting plate fixed to the hospital gurney.

3. The combination of claim 2, wherein at least one of said plurality of engagement pins is connected to said at least one mounting plate.

4. The combination of claim 3, wherein each said plurality of engagement pins is attached to said at least one mounting plate.

5. The combination of claim 4, wherein each said plurality of engagement pins is vertically adjustable.

6. The combination of claim 2, wherein said at least one mounting plate is fixed to said hospital gurney via at least one U-bolt.

7. The combination of claim 2, wherein at least one of said plurality of engagement pins is adjustably connected to said at least one mounting plate.

8. The combination of claim 1, wherein said detachable power unit comprises:

a power supply;

at least one drive wheel;

a drive system;

a motor;

at least one idler wheel; and a steering column.

9. The combination of claim 8, wherein said steering column comprises handle bars.

10. The combination of claim 9, wherein said handle bars further comprise control grips which control operation of the motor.

11. The combination of claim 10, wherein a length of said steering column is adjustable.

12. The combination of claim 10, wherein said control grips comprise pressure transducers.

13. The combination of claim 10, wherein said control grips comprise forced displacement controllers.

14. The combination of claim 8, wherein said steering column is mounted to at least one a collar comprising a bearing.

15. The combination of claim 8, wherein said at least one idler wheel is retractable.

16. The combination of claim 8, wherein said steering column passes through and freely rotates within at least one a collar, a bushing and a bearing.

17. The combination of claim 8, wherein the motor is connected to said at least one drive wheel via one of a drive belt, a chain, a drive-shaft, and gears.

18. The combination of claim 8, wherein said at least one drive wheel is steerable.

19. The combination of claim 8, wherein said at least one drive wheel is arranged beneath a center of the hospital gurney.

20. The combination of claim 1, wherein the combination further comprises a charging station.

21. The combination of claim 20, wherein said charging station comprises a battery charger and a plurality of recharging pins, wherein said plurality of engagement pins are adapted to receive the plurality of recharging pins.

22. The combination of claim 21, wherein said plurality of recharging pins are electrically conductive.

23. The combination of claim 22, wherein said charging station is adapted to receive power from one of an external voltage source and a 110 volt AC source.

24. The combination of claim 20, wherein said charging station comprising a battery charger which is arranged of said detachable power unit.

25. The combination of claim 24, wherein said charging station is adapted to receive power from one of an external voltage source and a 110 volt AC source.

26. The combination of claim 20, wherein said charging station can be docked with said detachable power unit.

27. The combination of claim 1, further comprising a locking system adapted to secure the detachable power unit to each of the hospital gurney and a charging station.

28. The combination of claim 27, wherein the locking system comprises at least one substantially flat plate which can move in a substantially perpendicular manner.

29. The combination of claim 1, wherein said combination further comprises a charging device comprising a plurality of recharging pins having a notch.

30. The combination of claim 29, further comprising a locking system adapted to secure said plurality of recharging pins within said plurality of receptacles.

31. The combination of claim 1, further comprising a locking system adapted to secure said plurality of engagement pins within said plurality of receptacles.

32. The combination of claim 31, said locking system comprises a substantially U-shaped plate that is adapted to engages a notch of at least one of said engagement pins.

33. The combination of claim 1, wherein each of said plurality of engagement pins comprises a notch located substantially at a distal end thereof.

34. The combination of claim 1, wherein the plurality of receptacles are adapted to removably engage a plurality of recharging pins.

35. The combination of claim 1, further comprising at least one mounting plate, wherein the at least one mounting plate is adapted to be connected to a plurality of gurneys.

36. The combination of claim 1, wherein said plurality of receptacles comprise internally arranged electric contacts.

37. The combination of claim 36, wherein said internally arranged electric contacts are electrically connected to a power supply.

38. The combination of claim 1, wherein said detachable power unit further comprises brakes.

39. A power unit for moving a hospital gurney, said power unit comprises:

a power supply;

at least one drive wheel;

a motor for driving the at least one drive wheel;

at least one retractable idler wheel which can move between an extended position and a retracted position;

a steering column; and a system for docking with the hospital gurney, wherein the system for docking with the hospital gurney comprises a plurality of engagement pins and a plurality of receptacles which receive the plurality of engagement pins.

40. The unit of claim 39, further comprising handle bars with control grips for controlling said motor.

41. The unit of claim 40, wherein said control grips comprise one of pressure transducers and force displacement controllers.

42. The unit of claim 39, wherein said power unit further comprises a battery charger.

43. The unit of claim 39, wherein said steering column further comprises handle bars.

44. The unit of claim 39, wherein the motor is connected to said at least one drive wheel via one of a drive belt, a chain, a drive-shaft, and gears.

45. The unit of claim 39, wherein said at least one drive wheel is steerable.

46. The unit of claim 39, wherein said at least one drive wheel is arranged beneath the hospital gurney.

47. The unit of claim 39, wherein said steering column passes through and freely rotates within at least of one a collar, a bushing, and a bearing.

48. The unit of claim 39, wherein a length of said steering column is adjustable.

49. The unit of claim 39, wherein said power unit further comprises brakes.

50. A system for moving a hospital gurney, the system comprising:

a plurality of engagement pins that can be secured horizontally to the hospital gurney;

a detachable power unit that can be docked to the hospital gurney; and the detachable power unit comprising a plurality of horizontally arranged receptacles, wherein the plurality of horizontally arranged receptacles removably receive the plurality of engagement pins when the detachable power unit is docked to the hospital gurney.

51. The system of claim 50, wherein the locking system comprises at least one mounting plate, wherein the at least one mounting plate is adapted to be mounted to a plurality of gurneys.

52. The system of claim 51, wherein said at least one mounting plate is fixed to the hospital gurney.

53. The system of claim 52, wherein said at least one mounting plate is fixed to said hospital gurney via at least one U-bolt.

54. The system of claim 51, wherein said plurality of engagement pins are attached to said at least one mounting plate.

55. The system of claim 50 wherein the plurality of horizontally arranged receptacles are adapted to engage a plurality of recharging pins.

56. The system of claim 55, further comprising a locking system which locks the plurality of horizontally arranged receptacles to each of the plurality of engagement pins and the plurality of recharging pins.

57. The system of claim 50, further comprising a locking system which locks the plurality of horizontally arranged receptacles to the plurality of engagement pins.

58. The system of claim 50, wherein said plurality of engagement pins are vertically adjustable.

59. The system of claim 50, each of said plurality of engagement pins comprises a notch.

60. A method of propelling a hospital gurney, said method comprising:

moving a detachable power unit towards the hospital gurney;

connecting a plurality of horizontally arranged receptacles with a plurality of horizontally arranged engagement pins;

locking the plurality of horizontally arranged receptacles and the plurality of horizontally arranged engagement pins to each other;

steering the hospital gurney with the detachable power unit; and disconnecting the plurality of horizontally arranged receptacles and the plurality of horizontally engagement pins from each other.

61. The method of claim 60, wherein the plurality of receptacles are arranged on the detachable power unit and wherein the plurality of engagement pins are arranged on the hospital gurney.

62. The method of claim 60, further comprising causing a retractable idler wheel to retract from an extended position.

63. The method of claim 60, further comprising, after the disconnecting, moving the detachable power unit towards a charging unit.

64. The method of claim 60, further comprises docking the detachable power unit with a recharging station.

65. A motor-assisted unit for moving a hospital gurney, said unit comprising:

a detachable power unit for propelling the hospital gurney;

the detachable power unit being adapted to move a plurality of hospital gurneys and comprising a power supply, at least one drive wheel, a drive system, a steering column with handle bars, and at least one retractable idler wheel; and a plurality of receptacles arranged on the detachable power unit, wherein the plurality of receptacles are adapted to removably connect to each of a plurality of engagement pins arranged on the hospital gurney and a plurality of charging pins arranged on a charging station.

66. A system for moving a hospital gurney, said system comprising:

a detachable power unit comprising a plurality of receptacles;

a plurality engagement pins adapted to be coupled to the hospital gurney;

a locking system which is adapted to lock the plurality of engagement pins and the plurality of receptacles to each other; and at least one of:

electrical contacts arranged within the plurality of receptacles; and a retractable idler wheel mounted to the detachable power unit an d being retractable when the detachable power unit is docked to the hospital gurney, wherein the plurality of receptacles receive the plurality of engagement pins when the detachable power unit is docked to the hospital gurney.

* * * * *